US007751448B2

(12) United States Patent
Laroia et al.

(10) Patent No.: US 7,751,448 B2
(45) Date of Patent: Jul. 6, 2010

(54) METHOD OF SYMBOL TIMING SYNCHRONIZATION IN COMMUNICATION SYSTEMS

(75) Inventors: Rajiv Laroia, Basking Ridge, NJ (US); Junyi Li, Bedminster, NJ (US); Vladimir Parizhsky, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 933 days.

(21) Appl. No.: 10/090,871

(22) Filed: Mar. 5, 2002

(65) Prior Publication Data

US 2002/0126706 A1 Sep. 12, 2002

Related U.S. Application Data

(60) Provisional application No. 60/274,897, filed on Mar. 9, 2001.

(51) Int. Cl.
*H04J 3/07* (2006.01)
*H04L 7/00* (2006.01)
*H04B 15/00* (2006.01)

(52) U.S. Cl. .................... 370/505; 375/355; 455/502

(58) Field of Classification Search ............... 370/350, 370/503, 505, 507, 516; 375/354, 145–147, 375/149, 359, 373, 260, 355; 455/75, 113, 455/119, 502, 39, 313
See application file for complete search history.

(56) References Cited

U.S. PATENT DOCUMENTS 5,734,676 A 3/1998 Dingsor 5,802,044 A 9/1998 Baum et al.
6,111,919 A * 8/2000 Yonge, III .................... 375/260

(Continued)

FOREIGN PATENT DOCUMENTS

EP 0 820 171 A1 1/1998

(Continued)

OTHER PUBLICATIONS

Notification of Transmittal of International Search Report and International Search Report for International Application No. PCT/US2002/006265, pp. 1-6, Dated: Jan. 24, 2003.

(Continued)

*Primary Examiner*—Aung S Moe
*Assistant Examiner*—Kerri M Rose
(74) *Attorney, Agent, or Firm*—Milan I. Patel

(57) ABSTRACT

Symbol timing synchronization in OFDM communication systems where multiple wireless terminals communicate with a single base station is described. Base station transmitter and receiver symbol timing is fixed. Each wireless terminal operates to independently adjust its transmitter timing. Transmitter timing synchronization at the wireless terminal is slaved to the terminal's receiver timing synchronization. Each wireless terminal first corrects its receiver symbol timing based on a signal received from the base station. The wireless terminal then adjusts its transmitter symbol timing as a function of its receiver symbol timing. When the receiver symbol timing is to be advanced or delayed by some amount, the transmitter symbol timing is also advanced or delayed, respectively, by the same, or substantially the same, amount. Symbol timing adjustment can be made by adding or deleting digital samples from the first or last symbol in a dwell.

41 Claims, 10 Drawing Sheets

U.S. PATENT DOCUMENTS

| | | | |
|---|---|---|---|
| 6,131,012 A | | 10/2000 | Struhsaker et al. |
| 6,151,295 A | * | 11/2000 | Ma et al. ............... 370/203 |
| 6,169,751 B1 | * | 1/2001 | Shirakata et al. ........... 370/480 |
| 6,470,005 B1 | * | 10/2002 | Knutson et al. ............ 370/347 |
| 6,519,291 B1 | | 2/2003 | Dagdeviren et al. |
| 6,563,862 B1 | * | 5/2003 | Knutson et al. ............ 375/219 |
| 6,665,541 B1 | | 12/2003 | Krasner et al. |
| 6,760,300 B1 | | 7/2004 | Eberle et al. |
| 6,760,393 B1 | | 7/2004 | Alisobhani et al. |
| 7,110,387 B1 | * | 9/2006 | Kim et al. ................. 370/344 |

FOREIGN PATENT DOCUMENTS

| | | |
|---|---|---|
| EP | 0 933 897 A2 | 4/1999 |
| EP | 0932284 | 7/1999 |
| EP | 0 933 897 A2 | 8/1999 |
| EP | 1 049 301 A2 | 11/2000 |
| EP | 1124347 | 8/2001 |
| GB | 2353681 | 2/2001 |
| JP | 11-275046 | 2/1998 |

OTHER PUBLICATIONS

Written Opinion for International Application No. PCT/US2002/006265, pp. 1-4, Dated: Feb. 24, 2004.

International Preliminary Examination Report for International Application No. PCT/US2002/006265, pp. 1-3, Dated: Aug. 18, 2004.

"A Time and Frequency Synchronization Scheme for Multiuser OFDM" by JJ Van De Beek et al., IEEE Journal of Selected Areas in Communications, vol. 17, No. 11, pp. 1900-1914, Published in Nov. 1999.

European Search Opinion-EP06023559, Europan Search Authority-Munich-Jan. 16, 2007.

"Synchronization of a TDMA-OFDM Frequency Hopping System" by JJ Van De Beek et al., IEEE VTC, pp. 1290-1294, Published in 1998.

European Search Opinion-EP02706481.5, Europan Search Authority-Munich-Mar. 30, 2004.

European Search Report—EP06023559, European Search Authority—Munich—Jan. 16, 2007.

\* cited by examiner

US 7,751,448 B2

METHOD OF SYMBOL TIMING SYNCHRONIZATION IN COMMUNICATION SYSTEMS

RELATED APPLICATIONS

The present application claims the benefit of U.S. Provisional patent application Ser. No. 60/274,897 filed Mar. 9, 2001.

FIELD OF THE INVENTION

The present invention relates to communications systems and, more particularly, to methods and apparatus for performing symbol timing, e.g., in frequency division multiplexed systems.

BACKGROUND OF INVENTION

In communication systems, e.g., radio or other wireless systems, the transmitter and the receiver frequently do not have access to a common clock source. Instead, there are likely two clocks running separately, one at the transmitter and another at the receiver. In wireless systems, base stations typically have very accurate clocks. However, due to cost considerations, wireless terminals, e.g., mobile telephones and/or other mobile communications devices, often use inexpensive clocks. In many cases, such inexpensive clocks are less accurate than the clocks used in the base stations with which the mobile stations interact.

One consequence of having different clocks at the transmitter and at the receiver is that the transmitter and receiver symbol timings often drift over time even when the transmitter and the receiver are perfectly synchronized at the beginning of a communication session. In order to ensure proper communication, it is important that symbol timing synchronization be maintained, throughout a communications session.

In a known communications synchronization system, the receiver symbol timing is made a slave to the transmitter symbol timing. In the known system a receiver continuously corrects the receiver symbol timing based on the received signal. The transmitter symbol timing is simply based on the clock used at the transmitter and does not need to be corrected. The above method works well in many point-to-point communications systems and in some multiple access systems as long as received symbols from different wireless terminals are not required to be aligned at the base station.

However, in other systems, the prior art synchronization method does not work effectively. For example, in an orthogonal frequency division multiplexed (OFDM) multiple access system, a base station receives OFDM symbols from multiple wireless terminals simultaneously. For the purpose of eliminating the interference between the wireless terminals, it is advantageous to have symbols from different wireless terminals arrive at the base station receiver synchronously. As different wireless terminals are likely to have different and time varying transmitter timing, it is not feasible to adjust the base station receiver timing as a slave to the transmitter timing of the numerous individual wireless terminals with which a base station receiver may interact. Hence, the prior art synchronization system does not work effectively in OFDM multiple access systems.

SUMMARY OF INVENTION

Figure 1:
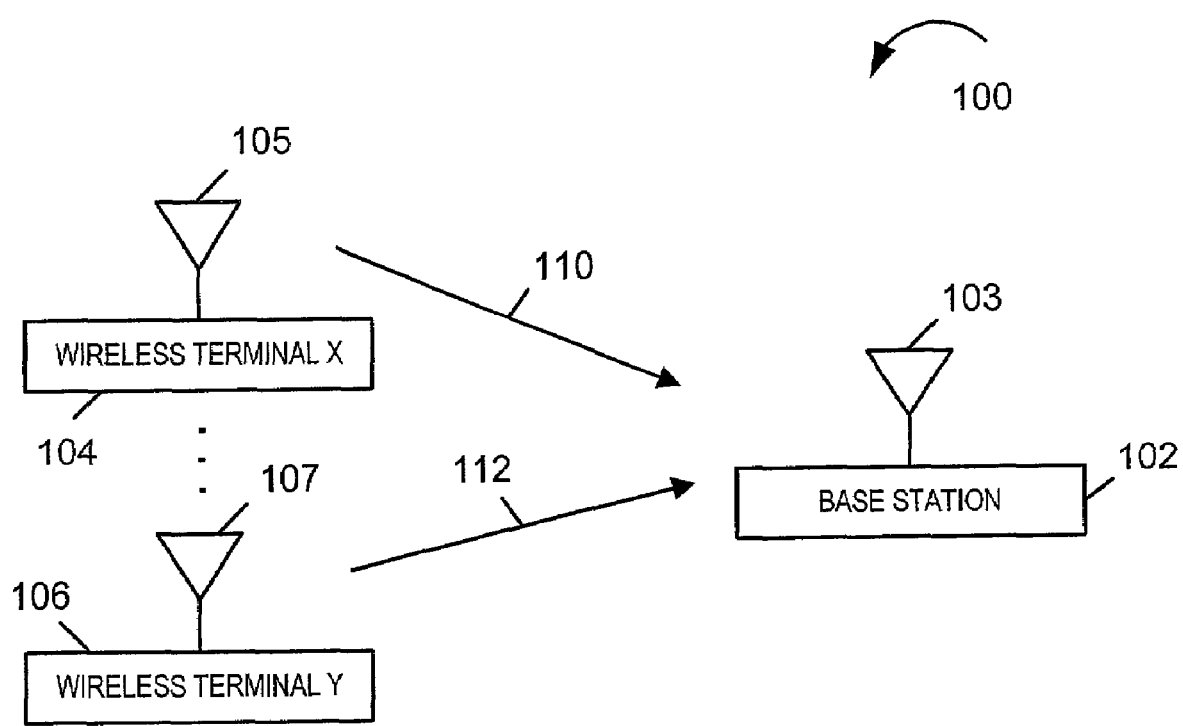
FIG. 1 illustrates a communication system implemented in accordance with the invention.

The present invention is directed to methods and apparatus for implementing symbol timing synchronization in OFDM communication systems. The OFDM communication systems can be point-to-point or multiple access. In a multiple access system, multiple wireless terminals communicate with a single base station.

In contrast to the known system discussed above, in accordance with the invention, the receiver symbol timing is fixed at the base station. Each wireless terminal operates to independently adjust its transmitter timing so that the symbols received from multiple wireless terminals are synchronized with the base station receiver symbol timing.

In accordance with the invention, the transmitter timing synchronization at the wireless terminal, e.g., mobile station, is slave to the mobile station's receiver timing synchronization. In an exemplary embodiment, the wireless terminal first corrects its receiver symbol timing based on the received signal. The wireless terminal then adjusts its transmitter symbol timing as a function of its receiver symbol timing. Thus, in accordance with various embodiments of the present invention, a mobile station's transmitter timing circuitry is made a slave to the mobile station's receiver timing circuitry.

In accordance with the invention, the correction of receiver symbol timing and transmitter symbol timing is carried out digitally by inserting or removing digital samples in a particular symbol duration in the receiver and transmitter respectively.

Transmitter timing adjustment is performed in a manner consistent with receiver timing adjustment, e.g., when the receiver symbol timing is to be advanced or delayed by some amount, the transmitter symbol timing is also advanced or delayed, respectively, by the same, or substantially the same, amount. Thus, in some embodiments transmitter symbol timing adjustments may vary slightly, e.g., up to 20%, from receiver symbol timing adjustments.

When transmitter symbol timing is to be corrected, in accordance with the invention, an OFDM symbol is selected to be used as a transition OFDM symbol. The duration of the transition OFDM symbol is determined, e.g., adjusted relative to the duration of a normal symbol, depending on the requirement of timing correction. The transition OFDM symbol has a duration which is longer or shorter than that of a normal OFDM symbol. In various embodiments the durations of OFDM symbols other than the transition OFDM symbols are left unchanged.

In a system implemented in accordance with the present invention, a wireless terminal, e.g., mobile station, may use the same tone or set of tones, e.g., frequency subcarrier or set of subcarriers, for a period of time, known as a dwell, comprising multiple symbol times prior to switching to another tone or set of tones. Such a system may switch tones for purposes of differential modulation. In one exemplary embodiment where dwells are used, in accordance with the invention, the transition OFDM symbol is chosen to be either the first symbol or the last symbol in a dwell. In such an embodiment when the first symbol in a dwell is chosen, the duration of the transition symbol's cyclic prefix is adjusted to achieve the desired symbol duration. When the last symbol in a dwell is chosen as the transition symbol, the duration of the transition symbol is adjusted by changing the duration of the transition symbols FFT (Fast Fourier Transform) body as opposed to cyclic prefix.

In some wireless systems, a wireless communications device, e.g., may be in communications with two or more base stations at the same time. This may occur, e.g., when a mobile device is transitioning from one cell of a wireless communications system to another and seeks to make a communications link with a new base station before losing or terminating the connection with an existing base station. In such an embodiment, symbols may be received from and transmitted to, each of the two base stations.

In accordance with one feature of the present invention, receiver and transmitter symbol timing associated with each of the two base stations is performed independently. In accordance with the present invention, the mobile device's receiver corresponding to the first base station determines symbol timing adjustments to be made with regard to the sampling of data including symbols being received from the first base station. The mobile device's symbol timing relating to the transmission of symbols to the first base station is adjusted in the same manner, e.g., in the same direction and by the same amount, as the timing adjustments made to the processing of symbols received from the first base station. In the same or a similar manner, the mobile device's receiver corresponding to the second base station determines symbol timing adjustments to be made with regard to sampling of data corresponding to symbols being received from the second base station. The mobile device's symbol timing relating to the transmission of symbols to the second base station is adjusted in the same manner, e.g., in the same direction and by the same amount, as the timing adjustments made to the processing of symbols received from the second base station. Thus, a single mobile device may implement multiple, symbol timing correction operations, e.g., one per base station with which the mobile device is communicating. The corrections may be independent of one another. The corrections are preferably done digitally but may be performed in the analog domain.

While described in the exemplary context of an OFDM communications system, the symbol timing correction techniques of the present invention are applicable to a wide range digital communications systems, point-to-point or multiple access, and is not necessarily limited to OFDM or even frequency division multiplexed systems.

By adjusting transmitter symbol timing of mobile wireless devices in the above described manner as a function of receiver timing adjustments, the need to adjust base station receiver symbol timing to match that of a particular wireless communication device's transmitter symbol timing is reduced or avoided. In addition, the need to transmit transmitter symbol timing correction signals to individual mobile wireless devices, instructing the specific individual wireless device how to adjust its transmitter timing, is reduced or avoided. Accordingly, the methods and apparatus of the present invention can facilitate the efficient use of the available communications bandwidth.

DETAILED DESCRIPTION OF INVENTION

The present invention is applicable to a wide range of digital communications systems, point-to-point or multiple access, where a first communication device communicates with a second communication device.

FIG. 1 shows an exemplary OFDM multiple access system 100 in which several first communication devices, that is, wireless terminals 104, 106, e.g., mobile stations, transmit OFDM signals 110, 112 to a second communication device, that is a single base station 102, simultaneously. Signals 110, 112 each include one or more symbols, e.g., OFDM symbols. The wireless terminals 104, 106 include antennas 105, 107 for the transmission of signals 110, 112. Base station 102 includes antenna 103 for receiving the transmitted signals 110, 112.

Figure 9:
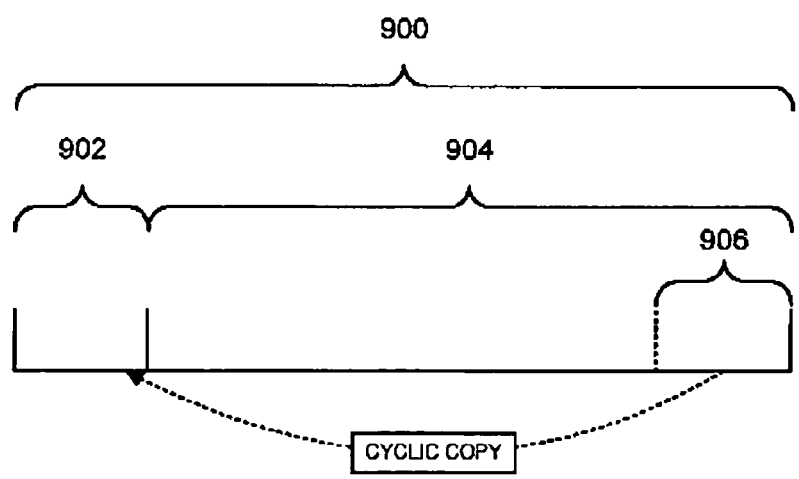
FIG. 9 illustrates an OFDM symbol which may be transmitted by the system shown in FIG. 1.

In the exemplary system 100, OFDM symbols comprise two parts, a cyclic prefix and an FFT body. FIG. 9 illustrates an example of such an OFDM symbol 900 which includes a total of N samples. The cyclic prefix 902 includes K samples while the FFT body 904 includes N-K samples. The K samples included in the cyclic prefix are obtained by copying the last K samples 906 of the FFT body and positioning them in front of the FFT body portion 904 of the transmitted symbol. Thus, a symbol's cyclic prefix 902 is normally a copy of the last portion of the FFT body.

Referring once again to FIG. 1, OFDM symbols transmitted from different wireless terminals 105, 107 arrive additively at a receiver included in base station 102. The base station receiver uses a symbol window to select a portion of the received signal 110, 112 as corresponding to an OFDM symbol. The base station's receiver then carries out an FFT operation on the symbol portion to obtain information, transmitted from the individual wireless terminals, to the base station. Receiver symbol timing determines where to place the symbol window.

Figure 2:
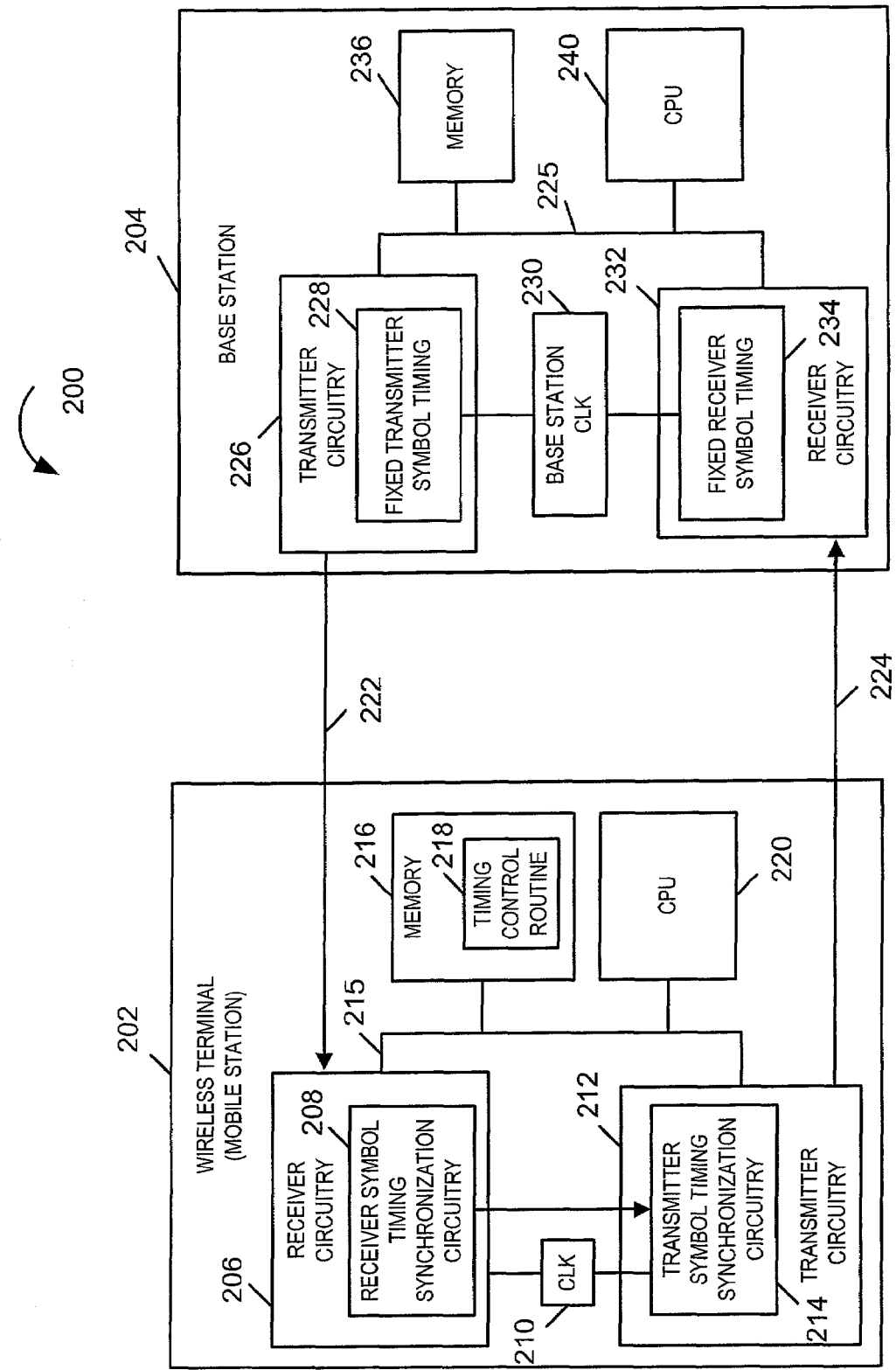
FIG. 2 illustrates a base station and a wireless terminal which may be used in the system shown in FIG. 1.

FIG. 2 is a diagram 200 illustrating a base station 204 and an exemplary wireless terminal 202 implemented in accordance with the invention. Base station 204 may be used as the base station 102 of the system 100. Wireless terminal 202 may be used as any one of the wireless terminals 104, 106 of the system 100 shown in FIG. 1.

Base station 204 transmits signals 222, to the wireless terminal 202 and receives signals 224 from the wireless terminal. The transmitted and received signals 222, 224 may include, e.g., OFDM symbols. The base station 204 includes a clock 230, transmitter circuitry 226, receiver circuitry 232, a memory 236 and central processing unit 240 which are coupled together by a bus 225. The base station clock 230 is used to supply clock signals used to control symbol timing to both the transmitter circuitry 226 and receiver circuitry 232. A relatively accurate clock is used for the base station clock 230. The clock in the wireless terminals 202 may be less accurate than the base station clock due to attempts to keep the cost of the mobile devices 202 low.

The base station's transmitter circuitry 226 includes a fixed transmitter symbol timing circuit 228 which is responsive to the base station clock 230. The receiver circuitry 232 similarly included a fixed receiver symbol timing circuit 234 which is also responsive to the clock 230. Accordingly, in the system 200, the base station does not adjust or modify its transmitter or receiver timing based on information from an individual wireless device such as wireless terminal 202. In embodiments where multiple wireless terminals 202 are served by a single base station 204, the synchronization method of the invention avoids the complexity that would result from attempting to adjust symbol timing at the base station based on information from various, different, wireless terminals 202.

Figure 3:
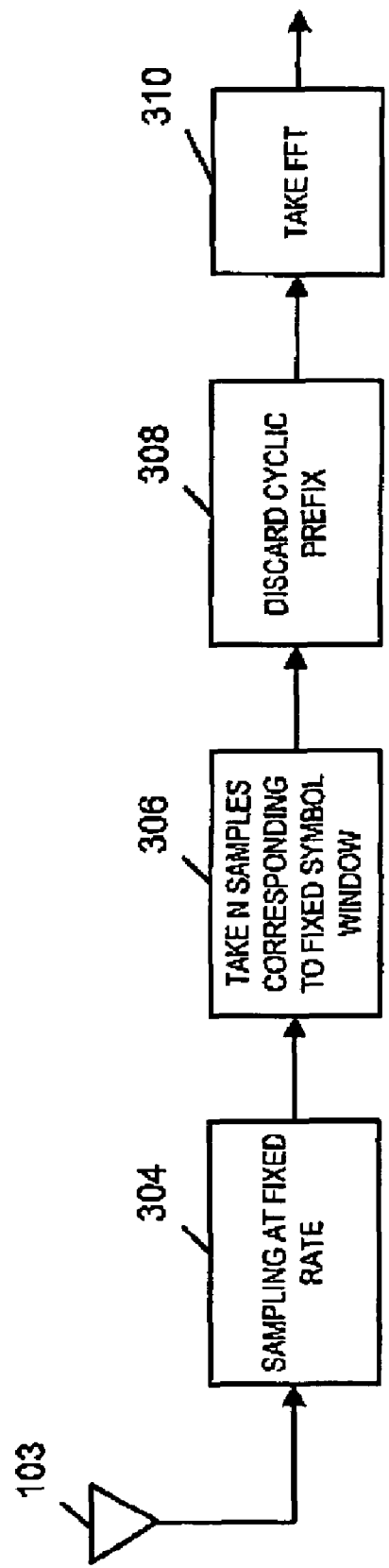
FIG. 3 illustrates the processing of a set of received symbols by a receiver included in the system of FIG. 1.

FIG. 3 shows the operations carried out at the base station's receiver 232. As shown in FIG. 3 a signal received at the base station 102 is subject to various processing operations. In step 304, the received signal is sampled at a fixed rate. Then in step 306, the receiver circuitry takes N samples from the sampled signal which correspond to a fixed symbol window. The cyclic prefix is then discarded from the selected set of samples in step 308. Following the discarding of the cyclic prefix, an FFT is performed on step 310 of the remaining portion of the set of samples selected as corresponding to a received symbol. Steps 304, 306, 308 and 310 repeatedly performed over a period of time to recover the transmitted symbols.

In one embodiment, the base station 102 includes a circuit for performing each of the functions or steps illustrated in FIG. 3. In another embodiment, some or all of the functions/steps are implemented on CPU 240 under software control. Software routines for implementing the illustrated operations may be stored in memory 236 included within the base station 102. In accordance with the process illustrated in FIG. 3, the base station receiver 232 samples the received signal at a fixed rate. For purposes of explanation, suppose that the total length of an OFDM symbol is equal to N samples and that the length of the cyclic prefix in an OFDM symbol is equal to K samples.

Based on the receiver symbol timing, the base station 102 repeatedly selects N samples, e.g., a set of samples corresponding to a transmitted symbol, in the sequence of received digital signal samples. The base station discards the first K samples and retains the remaining N-K samples. An FFT operation is then performed on the N-K samples to recover the information transmitted by the wireless terminals. The sampling rate is derived from the clock 230 used by the base station 102, which may be quite different from the clocks 210 used by each of the wireless terminals 202. The sampling operation and the receiver symbol timing at the base station 102 are fixed, that is, not adjusted based on the received signal.

Referring once again to FIG. 2, it can be seen that wireless terminal 202 includes a clock 210, receiver circuitry 206, transmitter circuitry 212, memory 216 and a central processing unit 220 which are coupled together by a bus 215. The clock 210 supplies a timing signal to receiver circuitry 206 and transmitter circuitry 214. Due to differences in clocks found in different wireless terminals 202, transmitter and receiver timing may have to be adjusted periodically to compensate for variations in clock speed from the intended clock speed and/or the speed of the base station clock 230. Memory 216 includes a timing control routine 218 that is executed by CPU 220. Timing control routine 218 includes software and/or other processing instructions used to control the wireless terminal 202 and circuits 206, 212 included therein, to implement the symbol timing adjustment method of the present invention. In addition to timing control routine 218, memory 216 is used to store data to be transmitted by the terminal 202 and data that is received by the terminal 202.

Receiver circuitry 206 is responsible for receiving, via an antenna included in the receiver circuitry, signals 222 transmitted from the base station 204 to the wireless terminal 202. Receiver circuitry 206 is also responsible for processing the received signal 222, e.g., digitizing it and segmenting it into symbols as will be discussed below. Receiver symbol timing synchronization circuitry 208 is used to determine what adjustments in receiver symbol timing should be made in accordance with the present invention and for conveying symbol timing adjustment information to transmitter symbol timing synchronization circuitry 214 included in transmitter circuitry 212. The receiver symbol timing synchronization circuitry 208 adjusts receiver timing in an attempt to match the timing of the base station's transmitter circuitry 226.

Wireless terminal transmitter circuitry 214 is responsible for generating signals 224 to be transmitted by the wireless terminal. The transmitter circuit 212 includes an antenna for broadcasting the signals 224. The signals include, e.g., OFDM symbols. Transmitter circuit 212 also includes transmitter symbol timing synchronization circuitry 214 for adjusting, e.g., periodically, in accordance with the present invention, transmitted symbol timing. This may be done, as will be discussed below, by adding or removing samples to one or more symbols being transmitted. The symbol timing adjustment made by circuit 214 is in the same direction and the same, or substantially the same, amount as the symbol timing adjustment made by the receiver symbol timing synchronization circuitry 208. Since the base stations clock 230 is used to drive both the base station's receiver circuitry timing as well as its transmitter timing, assuming the wireless terminal's receiver circuitry 206 is successful in synchronizing wireless receiver timing to that of the base station's transmitter, the corresponding adjustment to the wireless terminal's transmitter circuitry 212 will facilitate synchronization of the wireless terminal's transmitter circuitry 212 with the base station's receiver circuitry 234.

By making the wireless transmitter's symbol timing adjustments a function of receiver timing changes, timing discrepancies between the base station clock 230 and the wireless terminal's clock 210 are compensated for through symbol timing corrections in the above described manner which occur relatively frequently, e.g., at the start or end of each dwell.

Motion of a wireless device 202 relative to a fixed base station, e.g., base station 204, may have some influence on the timing of received symbols. For example, as the wireless terminal travels further from the base station, the increase in distance may appear to the wireless terminal's receiver as a delay in the base station's transmitter symbol timing. To counter the effect of increasing distance between the wireless terminal and base station it may be desirable to delay the wireless terminal's receiver symbol timing and advance the wireless terminal's transmitter symbol timing. Changes in symbol timing due to wireless terminal motion tends to occur at a rate which is usually considerably slower than the rate at which differences between the wireless terminal's clock 210 and base station clock 230 affects symbol timing. Accordingly, correction of symbol timing errors due to discrepancies between a wireless terminals clock and a base station clock may be more important than symbol timing corrections directed to addressing the effect of changes in distance between receiver and transmitter circuits.

The effect of motion and changes in distance between the wireless terminal 202 and base station 204 may be ignored or corrected for using an additional timing control routine or circuitry. In one embodiment, the wireless terminal 202 includes an additional timing control routine and/or sub-routine designed to correct for symbol timing variations due to wireless terminal motion. Such corrections may be based on e.g., information and/or periodic signals, transmitted to and/or from the wireless terminal for purposes of determining transmission and/or reception delays. Such an adjustment routine would be in addition to the routine 218 that is used to correct for clock timing discrepancies in accordance with the invention.

In order to eliminate the interference between OFDM signals from different wireless terminals and interference between adjacent OFDM symbols, it is important that the received signals from the wireless terminals be synchronized with the receiver symbol timing. Specifically, the receiver symbol window should be placed such that the signal in the symbol window includes a single OFDM symbol from any given wireless terminal.

Figure 4:
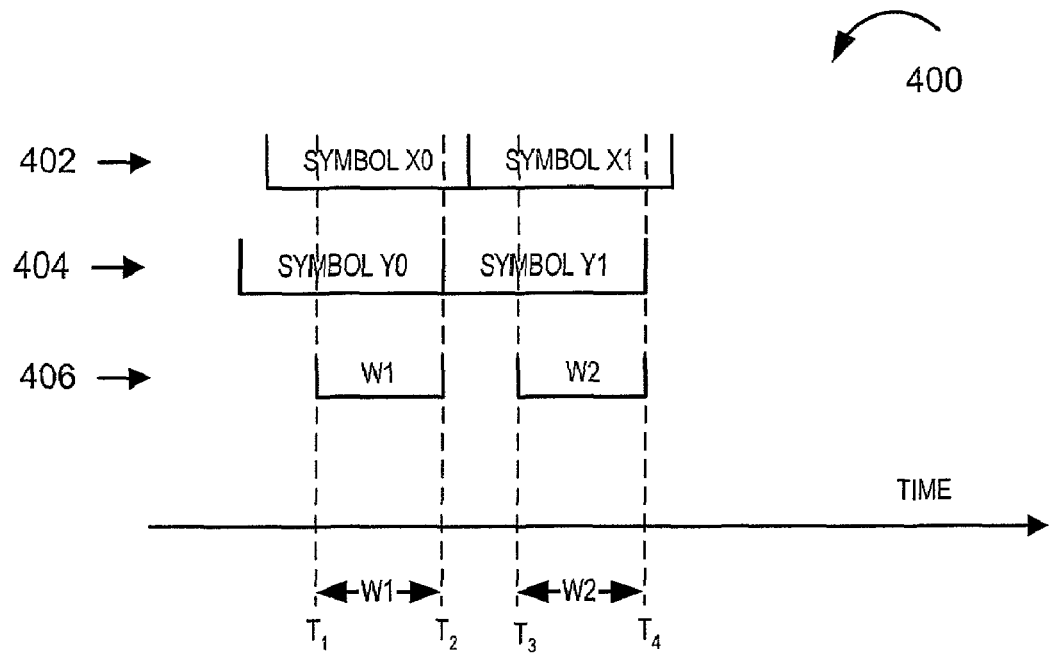
FIGS. 4 and 5 illustrate base station symbol timing associated with the processing of symbols by a base station receiver.

FIG. 4 is a timing diagram 400 that illustrates a scenario where the received signals from two wireless terminals 104, 106 are synchronized with the base station's receiver symbol timing. Row 402 illustrates two sequential symbols X0, X1 transmitted by the first wireless terminal 104. Row 404 illustrates two sequential symbols Y0, Y1 transmitted by the second wireless terminal 106. Row 406 illustrates two consecutive base station receiver symbol windows W1, W2 which correspond to the time period during which transmitted symbol data is selected to be treated as a received symbol. The first window W1 extends from time T1 to time T2. The second window W2 extends from time T3 to T4. Note that there is a period between symbol windows W1, W2 corresponding to the time between T2 and T3 in which received symbol data is not used. This time period is equal to or smaller than the cyclic prefix of the transmitted symbols. When receiver symbol timing is properly aligned with the transmitter symbol timing, windows W1 and W2 will correspond to the transmitted symbols X0, Y0 and X1, Y1 as shown in FIG. 4 resulting in proper recovery of the transmitted symbols.

Figure 5:
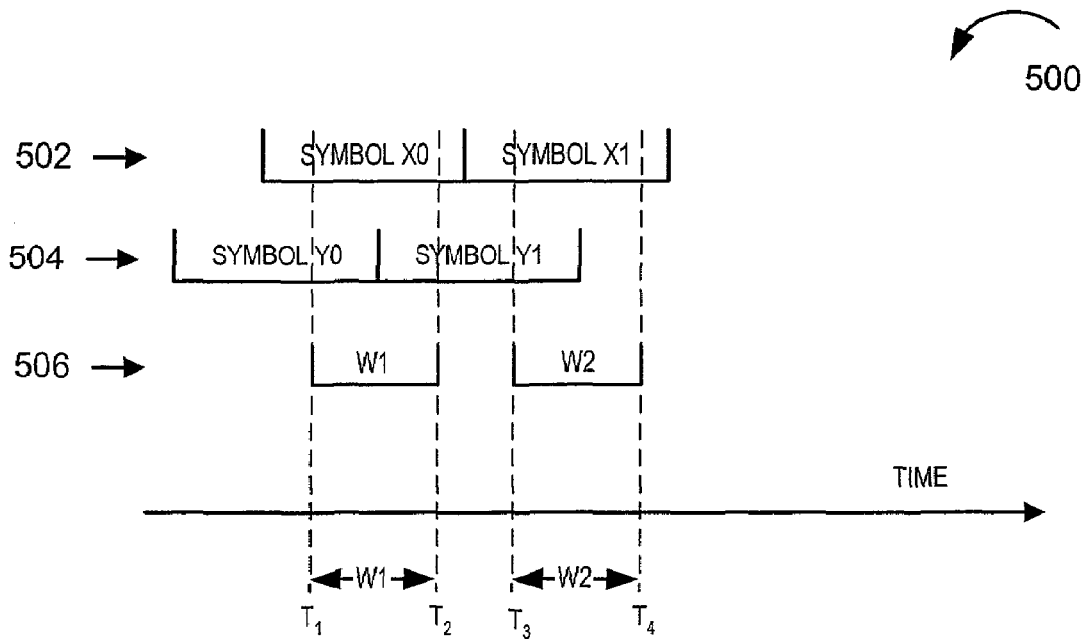

However, the received OFDM signals from different terminals 104, 106 may not always be aligned with each other and the receiver's symbol window resulting in the possible loss of symbol data. For example, FIG. 5 provides a timing diagram 500 where the received OFDM signals are not aligned, e.g., because the transmitters in the mobile stations are not synchronized. In the FIG. 5 diagram row 502 corresponds to symbols X0 and X1 transmitted by the first wireless terminal 104. Row 504 corresponds to symbols Y0, Y1 transmitted by the second wireless terminal 106. Row 506 illustrates two consecutive base station receiver symbol windows W1, W2 which correspond to the time period during which transmitted symbol data is selected to be treated as a received symbol. The exemplary symbol window timing shown in FIG. 5 results in symbols from the first wireless terminal 104 to be received properly. However, do to differences in symbol timing between the second wireless terminal's transmitter and the base station's receiver, symbols from the second wireless terminal 106 will not be detected properly. In the FIG. 5 example, there is no base station receiver symbol timing that can be synchronized with all the received OFDM signals, i.e., the OFDM symbols from wireless terminals 104, 106.

Given that the transmitters in wireless terminals may not be synchronized, e.g., in an OFDM multiple access system, the prior art synchronization system, where the basic idea is to fix the transmitter symbol timing and to adjust the receiver symbol timing to achieve synchronization, does not work effectively.

In accordance with the invention, different from the prior art synchronization system, the base station receiver uses fixed symbol timing. Each wireless terminal independently adjusts its transmitter timing so that the received symbols from all the wireless terminals are synchronized with the base station receiver symbol timing.

Figure 6:
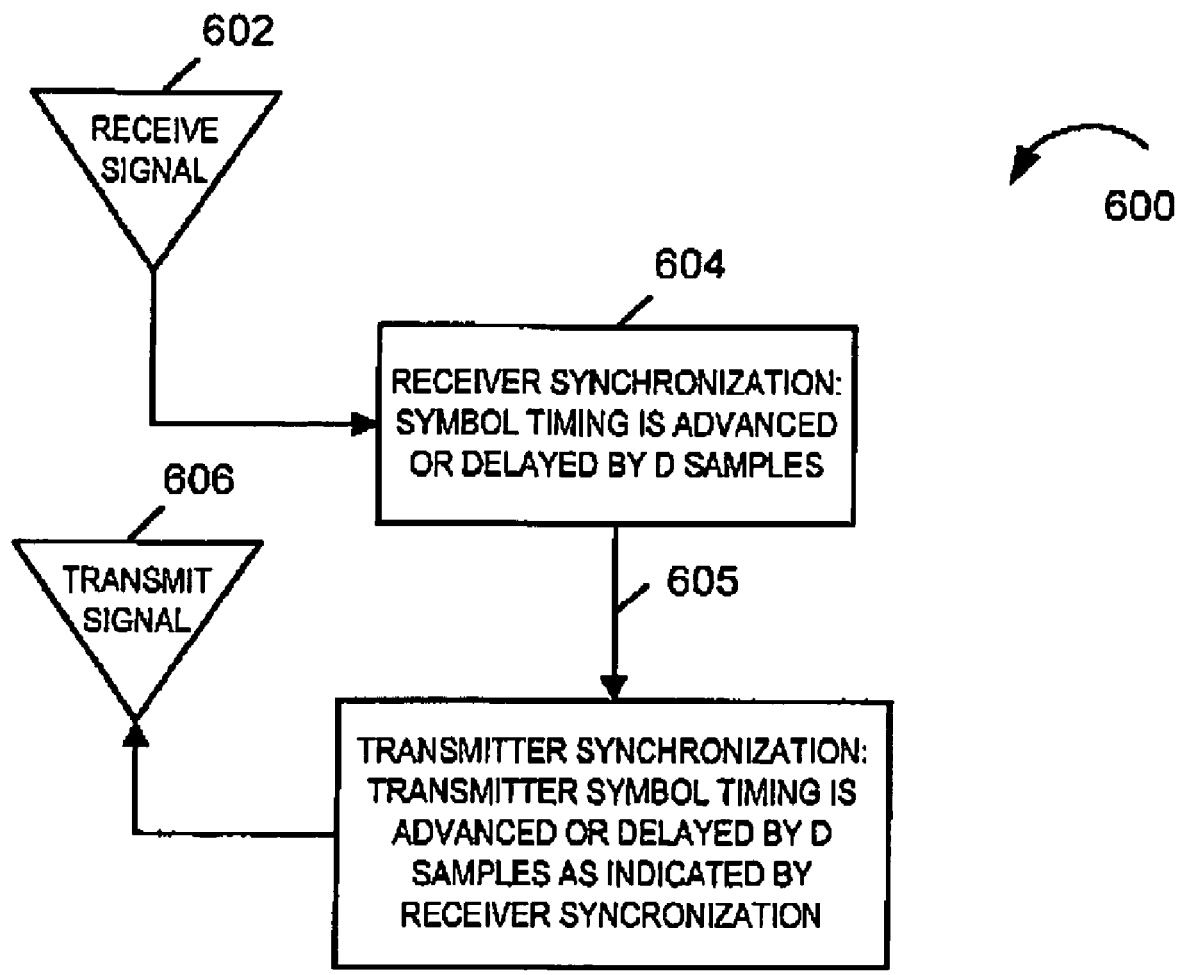
FIG. 6 illustrates a method of adjusting wireless terminal transmitter symbol timing as a function of wireless terminal receiver symbol timing adjustments.

FIG. 6 is a block diagram 600 showing, from a functional perspective, the steps performed by a wireless terminal as part of symbol timing synchronization performed in a communication system implemented in accordance with the invention. In step 602 the wireless terminal 202 receives a signal transmitted from base station 204. Then, in step 604, the receiver timing and synchronization circuitry 208 advances or delays the receiver symbol timing by D samples, where D is a positive integer, usually non-zero, integer. The receiver symbol timing adjustment information, e.g., the number, D, of samples by which the receiver timing is advanced or delayed, is transmitted, to the wireless terminal's transmitter symbol timing synchronization circuitry 212. Arrow 605 is used in FIG. 6 to represent the transmission of the value D and the direction of the timing correction, i.e., to be advanced or delayed. The transmitter symbol timing synchronization circuit 214 advances or delays the transmitter symbol timing by the same, or substantially the same, value D by which the receiver symbol timing was adjusted. Symbols generated with the adjusted transmitter symbol timing are then transmitted by the wireless device in step 606.

The adjustment of transmitter timing at the wireless terminals 202 can be based on a correction instruction received from the base station 204 such as the one described and used in U.S. patent application Ser. No. 09/503,040. In the system described in the cited U.S. patent application, each wireless terminal 202 transmits a particular signal, called a timing control signal, to the base station 204. The base station 204 estimates the arrival time of the received timing control signal and sends a correction instruction to correct the transmission timing of the wireless terminal as a function of the received signal, thereby ensuring synchronization between the wireless terminal's transmitter and base station's receiver. Such a closed-loop system is useful when different wireless terminals 202 have distinct unknown propagation delays to the base station 204 which can be determined from signals transmitted to the base station 204 from the individual wireless terminals.

The closed-loop system described in the cited patent application requires extra system resources, i.e., bandwidth and power, to transmit the timing control signals to the base station 204 and then to feedback correction messages to the wireless terminals 202. The extra resource overhead may not be significant if the closed-loop system is only responsible for correcting slowly drifting timing mismatches between the wireless terminal transmitters and the base station receiver, such as for the purpose of compensating propagation delay variation, e.g., due to changes in distance between the wireless terminals 202 and the base station 204.

However, as we have noted in the background section, the wireless terminals 202 use generally inexpensive and not very accurate clocks 210. The clock drift between the wireless terminals 202 and the base station 204 may be so fast that the extra resource overhead can be large if the closed-loop system is used to compensate for the drifting timing mismatch between the wireless terminal transmitters and the base station receiver that is attributable to clock differences and/or clock inaccuracies.

In accordance with the present invention, the adjustment of wireless terminals transmitter symbol timing is slaved to its receiver timing synchronization. Specifically, the wireless terminal 202 first carries out its receiver symbol timing synchronization based on the received signal. The receiver symbol timing synchronization at the wireless terminal can use any one of a plurality of methods including numerous known synchronization techniques.

Consider the case where the wireless terminal 202 of the present invention detects from the implemented timing synchronization method that the receiver symbol timing should be advanced by some amount, $\Delta$ corresponding, e.g., to D samples of the received signal. That is, the transmitter symbol timing at the base station 204 is $\Delta$ ahead of the receiver symbol timing at the wireless terminal 202. Such a timing drift is likely due to a clock mismatch between the base station 204 and the wireless terminal 202. In accordance with the present invention a common clock 210 is used to drive the receiver and transmitter circuitry 206, 212 in the wireless terminal 202. Accordingly, the receiver symbol timing at the base station 204 is also likely to be $\Delta$ ahead of the transmitter symbol timing at the wireless terminal 202. To correct the timing error, in accordance with the invention, the wireless terminal 202 advances its transmitter symbol timing by the same, or substantially the same, amount $\Delta$ used to adjust the wireless terminal's receiver timing.

Similarly, when the wireless terminal 202 detects that the receiver symbol timing should be delayed by some amount $\Delta$, the wireless terminal 202 also delays its transmitter symbol timing by the same, or substantially the same, amount $\Delta$, e.g., D samples.

As discussed above, FIG. 6 shows the operations carried out at wireless terminals in accordance with the invention. The illustrated functions may be performed using a CPU in the wireless terminal executing one or more routines obtained from memory which is also included in the wireless terminal. Each wireless terminal first corrects its receiver symbol timing based on the received signal, for example, using a conventional timing synchronization method. Then, the wireless terminal's transmitter symbol timing is adjusted as a function of, e.g., as slave to, the receiver symbol timing synchronization. When the receiver symbol timing is corrected, the wireless terminal also corrects its transmitter symbol timing in the same direction with the same or substantially the same amount of adjustment. For example, when the wireless terminal detects that the receiver timing needs to be delayed by D samples, the wireless terminal transmitter timing is also delayed by D samples. Similarly, when the wireless terminal detects that the receiver timing needs to be advanced by D samples, the transmitter timing in the wireless terminal is also advanced by D samples. If closed-loop timing control is used in the wireless terminal, in one embodiment the timing adjustment of the present invention is applied additively, e.g., in addition to the closed-loop timing control.

Figure 7:
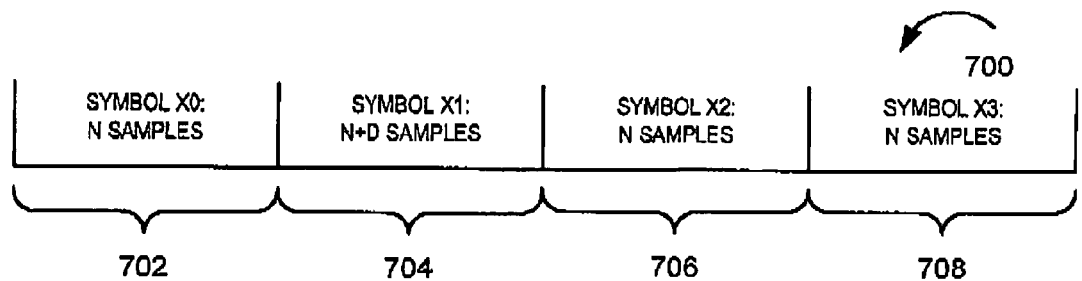
FIG. 7 illustrates the adjustment of symbol timing made in accordance with the present invention by inserting samples into a symbol used to adjust wireless terminal transmitter timing.

FIG. 7 shows the exemplary adjustment of wireless terminal transmitter symbol timing in the case where D samples are to be added to a symbol time period to make the necessary timing adjustment.

When a wireless terminal 202 is to adjust its transmitter symbol timing, it first selects an OFDM symbol, which is to be transmitted in the future, as the transition OFDM symbol, i.e., the symbol whose duration is to be modified to implement the desired symbol timing change. For example, in FIG. 7, at the duration of symbol X0, the wireless terminal X decides to adjust its transmitter symbol timing by D samples. Symbol X1 is then chosen as the transition symbol. In general, the transition OFDM symbol need not be the immediately next OFDM symbol to be transmitted. If the timing adjustment is to advance by D samples, the duration of the transition OFDM symbol is shortened by removing D samples. If the timing adjustment is to delayed by D samples, the duration of the transition OFDM symbol is enlarged by adding D samples.

In FIG. 7 the duration of the selected transition symbol X1 704 is lengthened by D samples thereby delaying transmitter timing by D samples. This results in symbols X0 702, X2 706 and X3 708 each having N samples with the transition symbol X1 704 including N+D samples. Thus, the durations of other non-transition OFDM symbols is left unchanged at N samples per symbol. The transition symbol X1 is transmitted by the wireless terminal 202 to a base station 204 along with the other symbols in the transmission sequence 700.

Figure 8:
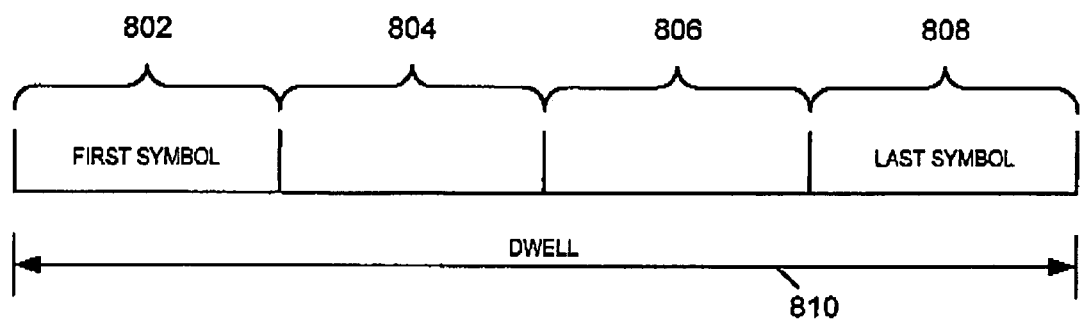
FIG. 8 illustrates a dwell and the first and last symbols whose duration maybe modified in accordance with an exemplary embodiment of the invention to make wireless terminal symbol timing corrections.

FIG. 8 shows the choice of the transition OFDM symbol and a method of changing the duration of the transition OFDM symbol in a system where a wireless terminal transmits symbols on the same tone over several consecutive symbols, for a period of time known as a dwell. The period during which the wireless terminal remains on the same tone, e.g., frequency subcarrier, is called a dwell. One purpose of staying with the same tone for a dwell is to use differential modulation.

In accordance with one feature of the present invention which is directed to transition symbol selection, the transition OFDM symbol is chosen to be either the first symbol or the last symbol in a dwell. If the first symbol is the transition symbol, the duration of the transition symbol is changed by cyclically adding or removing samples in the cyclic prefix portion. If the last symbol is the transition symbol, the duration of the symbol is changed by cyclically adding or removing samples in the FFT body portion. FIG. 8 illustrates the operations of cyclically adding or removing samples in the cyclic prefix or FFT body in the transition symbol. After making the adjustments, the adjusted symbol is transmitted by the wireless transmitter to the base station.

In the FIG. 8 illustration, the dwell 810 corresponds to four symbols 802, 804, 806 and 808. The first symbol 802 or the last symbol 808 is chosen as the transition symbol in accordance with one feature of the invention.

Figure 10:
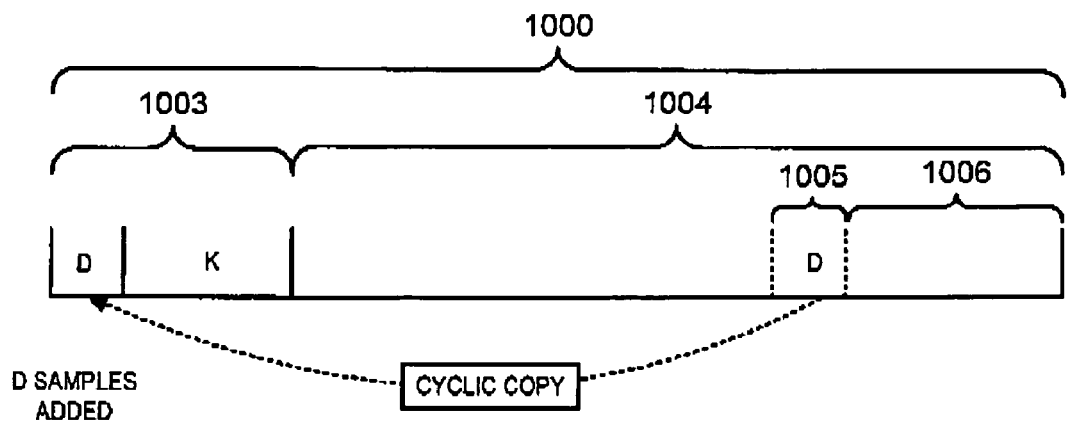
FIGS. 10 and 11 illustrate symbol timing adjustments made by modifying the number of samples in a symbol which is the first symbol in a dwell.
Figure 11:
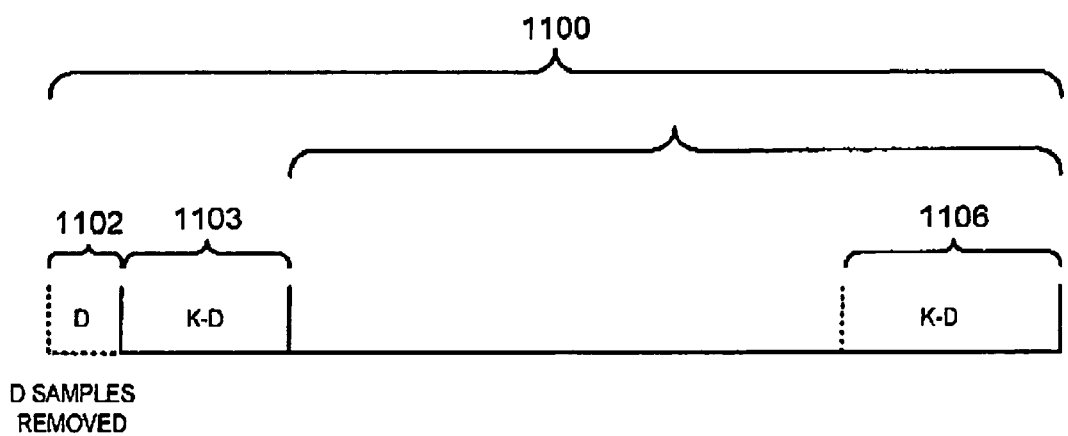

FIGS. 10 and 11 illustrate modification of the first symbol in a dwell to implement a symbol timing correction. FIG. 10 illustrates the case where samples are to be added to the transition symbol thereby lengthening the symbol. D samples 1005, immediately preceding the last K samples 1006 of the FFT body 1004 are copied and positioned in front of the normal K samples of the regular K sample cyclic prefix resulting in a cyclic prefix 1003 including K+D samples. The cyclic copy of D samples to the front of the symbol performed as shown in FIG. 10 results in a symbol 1000 with N+D samples.

FIG. 11 illustrates the case where samples are removed the transition symbol thereby shortening the symbol from the normal N samples to a symbol including N−D samples 1100. The shortening is achieved by reducing the size of the cyclic prefix by D samples 1102 resulting in a cyclic prefix having K−D samples 1103. Note that in the FIG. 11 example, only the last K−D samples 1106 of the symbol are copied for use as the cyclic prefix. Dashed lines are used in FIG. 11 to indicate that the D samples are not included in the transmitted symbol.

Figure 12:
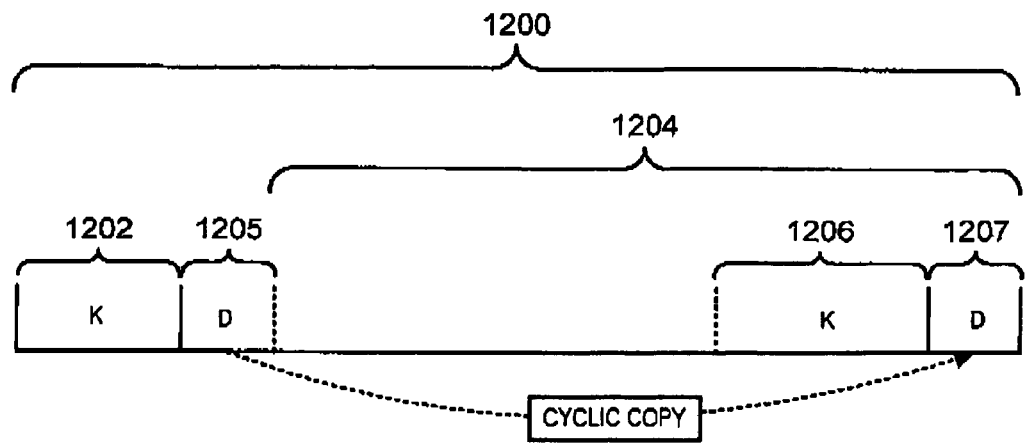
FIGS. 12 and 13 illustrate symbol timing adjustments made by modifying the number of samples in a symbol which is the last symbol in a dwell.
Figure 13:
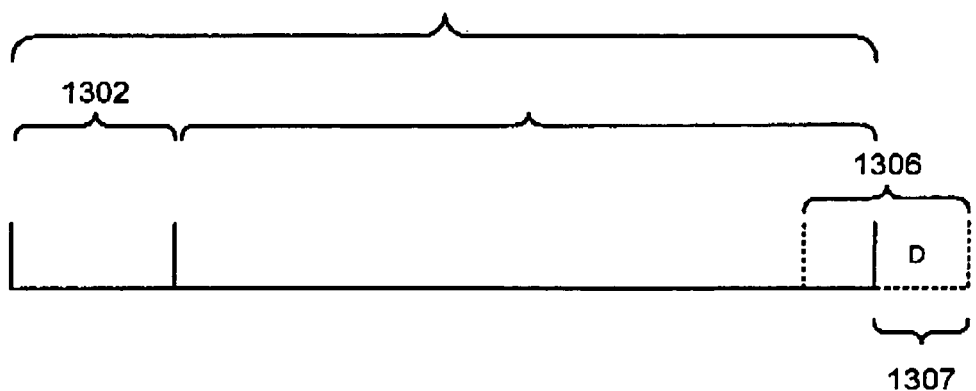

FIGS. 12 and 13 illustrate modification of the last symbol in a dwell to implement a symbol timing correction. FIG. 12 illustrates the case where samples are to be added to the transition symbol thereby lengthening the symbol. D samples 1205 of the FFT body, immediately preceding the K sample cyclic prefix 1202, are copied and following the K sample cyclic prefix 1202 are copied to the end of the symbol and positioned behind the K samples 1206 used to create the cyclic prefix 1206. In this manner the FFT body of the transition symbol shown in FIG. 12 is lengthened by D samples 1207 resulting in a transition symbol having N+D samples 1200 and an FFT body 1204 having N−K+D samples.

In FIG. 13, the overall symbol length is shortened to N−D samples by removing D samples 1307 from the end of the symbol to be transmitted. The cyclic prefix 1302 includes K samples copied from the last K samples 1306 of the FFT body prior to removal of the D samples 1307.

The present invention is also applicable to communications systems, where a first communication device communicates simultaneously with a second communication device and a third communication device.

Figure 14:
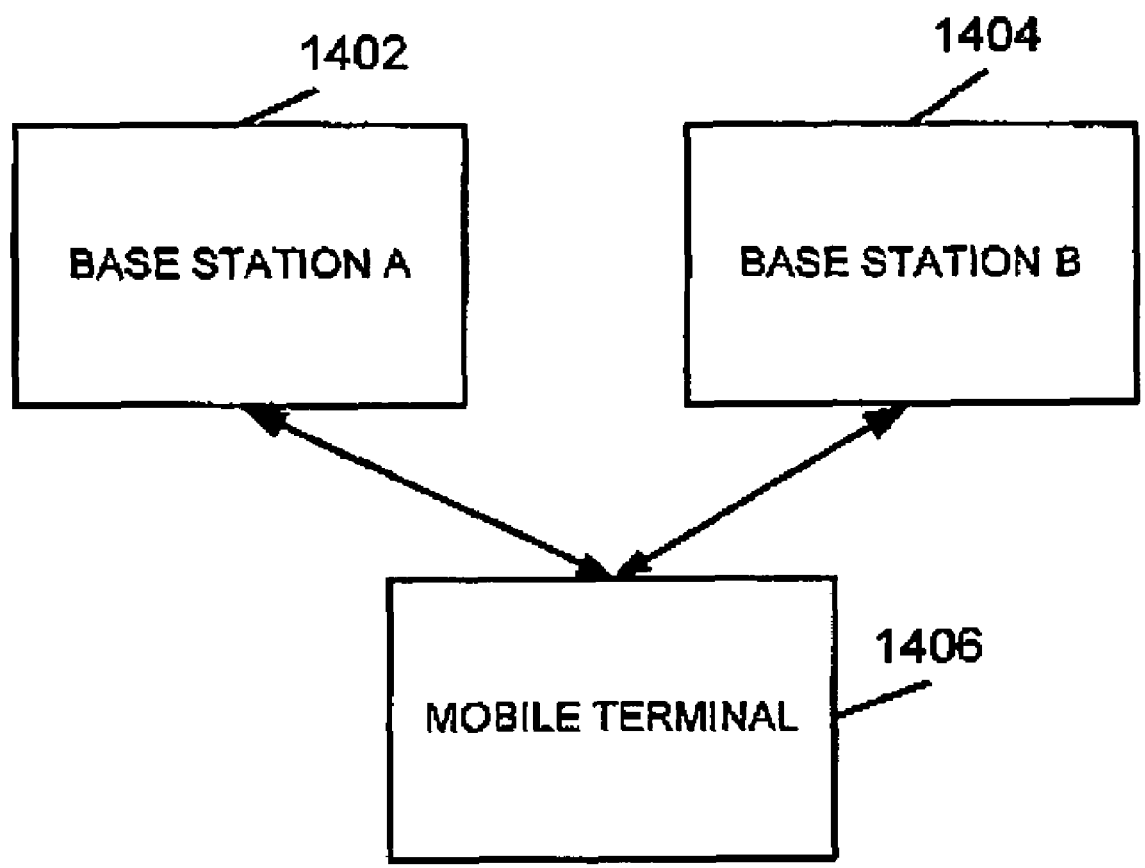
FIG. 14 illustrates a wireless terminal communicating with two base stations at the same time.

FIG. 14 illustrates the first communication device, that is, a mobile terminal 1406 in communication with the second and third communication devices, that is, two base stations 1402, 1404 at the same time in accordance with the present invention. Such a situation may occur, e.g., when the mobile terminal 1406 is traveling into a new cell served by the second base station B 1404, while still being registered with the first base station A 1402. The communication with base station B 1404 may be, e.g., to register with the new base station 1404 prior to terminating communication with the old base station 1404.

Figure 15:
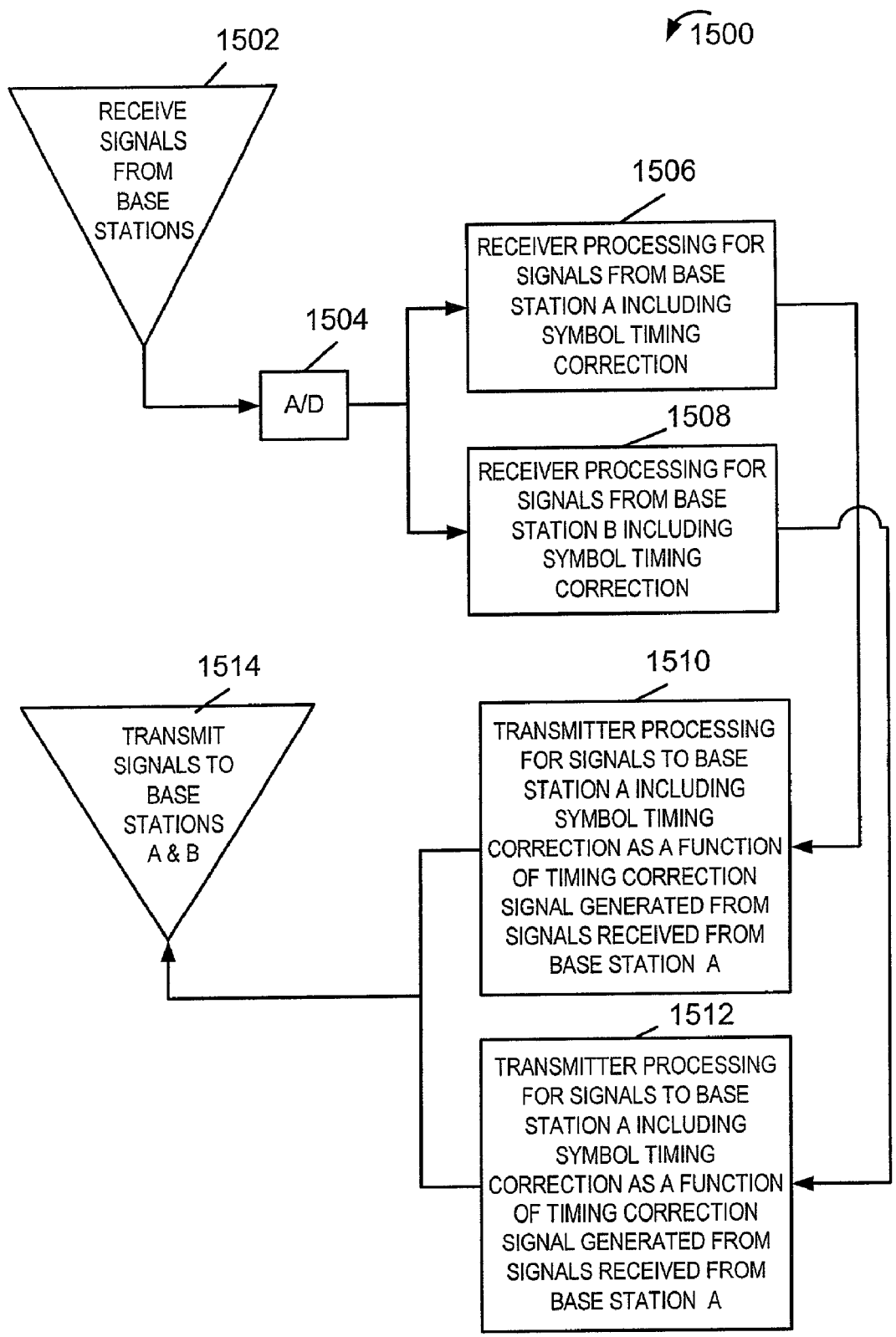
FIG. 15 illustrates a method of making symbol timing adjustments in accordance with an exemplary embodiment of the invention in a wireless terminal communicating to two base stations at the same time.

When in communication with two base stations 1402, 1404 it is desirable that the mobile terminal 1406 maintain and adjust different symbol timing windows for the communications to/from each of the base stations 1402, 1404. FIG. 15 shows a method 1500 for maintaining symbol timing synchronization between a mobile terminal 1406 and two different base stations 1402, 1404, at the same.

The mobile terminal symbol timing synchronization method 1500 begins in step 1502 with the mobile terminal 1406 receiving a signal representing transmissions from both base stations 1402, 1404. The received analog signal is converted into a plurality of digital samples by performing an analog to digital conversion operation in step 1504. The digital samples are then processed along two independent receiver processing paths.

A first receiver processing path begins with step 1506 and corresponds to processing intended to recover symbols received from base station A. As part of the receiver processing performed in step 1506, a symbol timing correction operation is performed to synchronize the symbol window used for processing the samples supplied by A/D converter to the symbol timing of the transmitter included in base station A 1402. Symbol timing correction information, associated with the processing of signals received from base station A, e.g., the number of samples the receiver timing is to be advanced or delayed is conveyed to transmitter processing step 1510 which is responsible for generating symbols to be transmitted to base station A. As part of the processing in step 1510, the symbol timing used for transmitting to the base station A is adjusted by the same, or substantially the same, amount as the mobile terminal's receiver symbol timing used to process signals from base station A 1402.

A second receiver processing path begins with step 1508 and corresponds to processing intended to recover symbols received from base station B 1404. As part of the receiver processing performed in step 1508, a symbol timing correction operation is performed to synchronize the symbol window used for processing the samples supplied by A/D converter to the symbol timing of the transmitter included in base station B 1404. Symbol timing correction information, associated with the processing of signals received from base station B 1404, e.g., the number of samples the receiver timing is to be advanced or delayed, is conveyed to transmitter processing step 1512 which is responsible for generating symbols to be transmitted to base station B 1404. As part of the processing in step 1512, the symbol timing used for transmitting to the base station B 1404 is adjusted by the same, or substantially the same, amount as the mobile terminal's receiver symbol timing used to process signals from base station B 1404.

Assuming the outputs of steps 1510 and 1512 are analog signals they are allowed to add together prior to transmission in step 1514. If the outputs of steps 1510, 1512 are digital samples, the digital signals can be summed and then subject to D/A conversion prior to transmission in step 1514.

In the above described manner, a wireless terminal may independently adjust separate transmitter symbol timing windows, corresponding to different wireless terminals, as a function of separate receiver symbol timing corrections made based on signals received at the same time from different base stations.

The steps of the various methods may be implemented in a variety of ways, e.g., using software, hardware or a combination of software and hardware to perform each individual step or combination of steps discussed above. Accordingly, various embodiments of the present invention include means for performing the steps of the various methods. Each means may be implemented using software, hardware, e.g., circuits, or a combination of software and hardware. When software is used, the means for performing a step may also include circuitry such as a processor for executing the software. Accordingly, the present invention is directed to, among other things, computer executable instructions such as software for controlling a machine or circuit to perform one or more of the steps discussed above.

What is claimed is:

1. A method of making symbol timing adjustments in a communications device including a transmitter which transmits multiple symbols in each of a plurality of dwells, the method comprising the step of:
   determining the number of samples by which the symbol timing is to be advanced or delayed during a dwell;
   increasing the number of samples in one of a first symbol and a last symbol of said dwell by the determined number of samples when said symbol timing is to be delayed during said dwell by the determined number of samples; and
   decreasing the number of samples in one of the first symbol and the last symbol of said dwell by the determined number of samples when said symbol timing is to be advanced during said dwell by the determined number of samples.

2. The method of claim 1, wherein the number of samples in the remaining symbols in the dwell which includes said one of the first symbol and the last symbol of said dwell to which samples were added or removed to adjust symbol timing do not have their number of symbols changed as part of making symbol timing adjustments.

3. The method of claim 1,
   wherein said one of a first symbol and a last symbol of said dwell is said first symbol, the first symbol including a cyclic prefix portion and a body portion; and
   wherein increasing the number of samples in said first symbol includes:

copying samples from the body portion of said first symbol and inserting the copied samples at the start of said first symbol thereby in creasing the number of samples in said first symbol.

4. The method of claim 1,
wherein said one of a first symbol and a last symbol of said dwell is said first symbol, the first symbol including a cyclic prefix portion and a body portion; and
wherein decreasing the number of samples in said first symbol includes:
removing samples from the start of the cyclic prefix portion thereby decreasing the number of samples in said first symbol.

5. The method of claim 1,
wherein said one of a first symbol and a last symbol of said dwell is said last symbol, the last symbol including a cyclic prefix portion and a body portion; and
wherein increasing the number of samples in said last symbol includes:
copying samples from the body portion of said first symbol and inserting the copied, samples at the end of said first symbol thereby increasing the number of samples in said first symbol.

6. The method of claim 1,
wherein said one of a first symbol and a last symbol of said dwell is said last symbol; and
wherein decreasing number of samples in said first symbol includes:
removing samples from the end of said last symbol thereby decreasing the number of samples in said last symbol.

7. A communications device, comprising:
a transmitter which transmits multiple symbols in each of a plurality of dwells, the transmitter including:
means for determining the number of samples by which the symbol timing is to be advanced or delayed during a dwell;
means for increasing the number of samples in one of a first symbol and a last symbol of said dwell by the determined number of samples when said symbol timing is to be delayed during said dwell by the determined number of samples; and
means for decreasing the number of samples in one of the first symbol and the last symbol of said dwell by the determined number of samples when said symbol timing is to be advanced during said dwell by the determined number of samples.

8. The device claim 7,
wherein said one of a first symbol and a last symbol of said dwell is said first symbol, the first symbol including a cyclic prefix portion and a body portion; and
wherein said means for increasing the number of samples in said first symbol includes:
means for copying samples from the body portion of said first symbol and inserting the copied samples at the start of said first symbol to thereby increase the number of samples in said first symbol.

9. The device of claim 7,
wherein said one of a first symbol and a last symbol of said dwell is said first symbol, the first symbol including a cyclic prefix portion and a body portion; and
wherein said means for decreasing the number of samples in said first symbol includes:
means for removing samples from the start of the cyclic prefix portion to thereby decrease the number of samples in said first symbol.

10. The device of claim 7,
wherein said one of a first symbol and a last symbol of said dwell is said last symbol, the last symbol including a cyclic prefix portion and a body portion; and
wherein said means increasing the number of samples in said last symbol includes:
means for copying samples from the body portion of said first symbol and inserting the copied samples at the end of said first symbol thereby increasing the number of samples in said first symbol.

11. The device of claim 10,
wherein said one of a first symbol and a last symbol of said dwell is said last symbol; and
wherein said means for decreasing the number of samples in said first symbol includes:
means for removing samples from the end of said last symbol thereby decreasing, the number of samples in said last symbol.

12. A method for adjusting symbol timing in a first communications device in an Orthogonal Frequency Division Multiplexing system, the method comprising:
determining a receiver symbol timing adjustment to be made to adjust receiver symbol timing in said first communications device to synchronize receiver symbol timing to the symbol timing of a second communications device; and
adjusting the symbol timing of a transmitter in said first communications device as a function of said determined receiver symbol timing adjustment,
said step of adjusting the symbol timing of the transmitter including selecting one of a first and a last symbol in a dwell to be modified to adjust the transmitter symbol timing, said dwell being a period of time comprising multiple symbol times during which a tone or set of tones is used by the first communications device prior to switching to another tone or set of tones.

13. The method of claim 12, wherein said receiver symbol timing adjustment indicates that symbol timing should be adjusted by an amount corresponding to D digital signal samples.

14. The method of claim 13, wherein said step of determining a receiver symbol timing adjustment includes:
receiving a symbol timing correction signal transmitted from said second communications device.

15. The method of claim 13, wherein the first communication device is a wireless terminal.

16. The method of claim 15, wherein the second communication devise is a base station.

17. The method of claim 16, further comprising:
determining an additional receiver symbol timing adjustment to be made to adjust receiver symbol timing of an additional receiver in said first communications device to synchronize the additional receiver symbol timing to be the symbol timing of a third communications device, said third communications device being an additional base station; and
adjusting the symbol timing of an additional transmitter in said first communications device as a function of said determined additional receiver symbol timing adjustment.

18. The method of claim 15, further comprising:
adjusting the symbol timing of a receiver included in said first communications device to delay said receiver symbol timing by said D samples; and
wherein the step of adjusting the symbol timing of said transmitter in said first communications device includes delaying the transmission of symbols by D samples by modifying the selected symbol by adding D samples to said selected symbol thereby increasing the duration of the selected symbol.

19. The method of claim 18, wherein symbols in said dwell other than said selected symbols are not changed as part of adjusting the symbol timing of said transmitter.

20. The method of claim 18, wherein the first symbol in said dwell is selected as said selected symbol, the selected symbol having N samples, the step of modifying the selected symbol by adding D samples including:
copying D samples from a body of said first symbol and inserting the D copied samples at the start of said selected symbol to produce a modified first symbol having N+D samples.

21. The method of claim 18, wherein the last symbol in said dwell is selected as said selected symbol, the selected symbol having N samples, the step of adjusting the symbol timing further including:
copying D samples from a body of said selected symbol and inserting the D copied samples at the end of said selected symbol to produce a modified last symbol having N+D.

22. The method of claim 15, wherein the step of adjusting the symbol timing of said transmitter in said wireless terminal includes:
adjusting the symbol timing of said transmitter included in said first communications device to advance the transmission of symbols.

23. The method of claim 22, wherein advancing the transmission of symbols includes the step of removing D samples from said selected symbol thereby decreasing the duration of said selected symbol.

24. The method of claim 23, wherein said selected symbol is the first symbol in said dwell, the selected symbol includes N samples beginning with a K sample cyclic prefix; and
wherein adjusting the symbol timing of said transmitter includes modifying said selected symbol by deleting D samples from the start of the K sample cyclic prefix of said selected symbol to produce a first modified symbol having N−D samples, where N, D and K are positive non-zero integers.

25. The method of claim 23, wherein said selected symbol is the last symbol in said dwell, the selected last symbol having N samples; and
wherein adjusting the symbol timing of said transmitter includes modifying said selected symbol by deleting D samples from the end of said selected symbol to produce a modified last symbol having N−D samples, where N and D are positive non-zero integers.

26. A mobile communications device for an Orthogonal Frequency Division Multiplexing system, comprising:
a clock;
receiver symbol timing control circuitry (208) coupled to said clock for determining a receiver symbol timing adjustment used to synchronize receiver symbol timing to the symbol timing of at least one broadcast signal;
transmitter symbol timing control circuitry coupled to said clock and to said receiver symbol timing control circuitry, the transmitter symbol timing control circuitry receiving symbol timing adjustment information from said receiver symbol timing adjustment circuitry
said transmitter symbol timing adjustment making a transmitter symbol timing adjustment in a direction which is the same as a receiver symbol timing adjustment made by said receiver symbol timing control circuitry;
said transmitter timing control circuitry including means for selecting a symbol to be lengthened or shortened prior to transmission to implement said symbol timing adjustment, said selected symbol being one of a first symbol and a last symbol in a dwell, said dwell being a period of time during which a transmitter of said mobile communications device remains on the same tone or being a period of time comprising multiple symbol tones on which said mobile communications device remains prior to switching to another tone or set of tones.

27. The mobile communications device of claim 26, wherein the symbol timing control circuitry further includes:
copy circuitry for performing a cyclic copy to be added samples to said selected symbol to be transmitted when said transmitter symbol timing is to be delayed; and
deleting, circuitry for deleting samples from said selected symbol to be transmitted when said transmitter symbol timing is to be advanced.

28. The mobile communications device of claim 27, wherein said symbols are frequency division multiplexed symbols, the mobile communication device farther comprising:
an antenna for transmitting symbols including a symbol whose duration has been changed by one of said copy circuitry and said deleting circuitry.

29. The mobile communications device of claim 26,
wherein said receiver symbol timing control circuitry includes means for independently determining symbol timing adjustments to be made when processing symbols corresponding to each of a first and a second base station; and
wherein said transmitter symbol timing control circuitry includes means for independently adjusting the symbol timing of symbols transmitted to the first and second base station, respectively, as a function of the symbol timing adjustments determined to be made when processing symbols corresponding to the first and second base stations, respectively.

30. A device comprising a processor, said processor including:
means for determining the number of samples by which the symbol timing is to be advanced or delayed during a dwell;
means for increasing the number of samples in one of a first symbol and a last symbol of said dwell by the determined number of samples when said symbol timing is to be delayed during said dwell by the determined number of samples; and
means for decreasing the number of samples in one of the first symbol and the last symbol of said dwell by the determined number of samples when said timing is to be advanced during said dwell by the determined number of samples.

31. The device of claim 30, wherein the number of samples in the remaining symbols in the dwell which includes said one of the first symbol and the last symbol of said dwell to which samples were added or removed to adjust symbol timing do not have their number of symbols changed as part of making symbol timing adjustments.

32. The device of claim 30,
wherein said one of a first symbol and a last symbol of said dwell is said first, symbol, the first symbol including a cyclic prefix portion and a body portion; and
wherein said means for increasing the number of samples in said first symbol includes:
means for copying samples from the body portion of said first symbol and inserting the copied samples at the start of said first symbol thereby increasing the number of samples in said first symbol.

33. A memory device embodying computer executable instructions for controlling a communications device to implement a method of making symbol timing adjustments in the communications device, the method comprising the steps of:

determining the number of samples by which the symbol timing is to be advanced or delayed during a dwell;

increasing the number of samples in one of a first symbol and a last symbol of said dwell by the determined number of samples when said symbol timing is to be delayed during said dwell by the determined number of samples; and decreasing the number of samples in one of the first symbol and the last symbol of said dwell by the determined number of samples when said symbol timing is to be advanced during said dwell by the determined number of samples.

34. The memory device of claim 33, wherein the number of samples in the remaining symbols in the dwell which includes said one of the first symbol and the last symbol of said dwell to which samples were added or removed to adjust symbol timing do not have their number of symbols changed as part of making symbol timing adjustments.

35. The memory device of claim 33, wherein said one of a first symbol and a last symbol of said dwell is said first symbol, the first symbol including a cyclic prefix portion and a body portion; and wherein the step of increasing the number of samples in said first symbol includes:

copying samples from the body portion of said first symbol and inserting the copied samples at the start of said first symbol thereby increasing the number of samples in said first symbol.

36. A memory device embodying computer executable instructions for controlling a first communications device to implement a method of adjusting symbol timing, the method comprising:

determining a receiver symbol timing adjustment to be made to adjust receiver symbol timing in said first communications device to synchronize receiver symbol timing to the symbol timing of a second communications device; and adjusting the symbol timing of a transmitter in said first communications device as a function of said determined receiver symbol timing adjustment, said step of adjusting the symbol timing of the transmitter including selecting one of a first and a last symbol in a dwell to be modified to adjust the transmitter symbol timing, said dwell being a period of time comprising multiple symbol times during which a tone or set of tones is used by the first communications device prior to switching to another tone or set of tones.

37. The memory device of claim 36, wherein said receiver symbol timing adjustment indicates that symbol timing should be adjusted by an amount corresponding to D digital signal samples.

38. The memory device of claim 37, wherein said step of determining a receiver symbol timing adjustment includes:

receiving a symbol timing correction signal transmitted from said second communications device.

39. A processor for use in a first communications device, said processor comprising:

means for determining a receiver symbol timing adjustment to be made to adjust receiver symbol timing in said first communications device to synchronize receiver symbol timing to the symbol timing of a second communications device; and means for adjusting the symbol timing of a transmitter in said first communications device as a function of said determined receiver symbol timing adjustment, said means for adjusting the symbol timing of the transmitter including means for selecting one of a first and a last symbol in a dwell to be modified to adjust the transmitter symbol timing, said dwell being a period of time comprising multiple symbol times during which a tone or set of tones is used by the first communications device prior to switching to another tone or set of tones.

40. The processor of claim 39, wherein said receiver symbol timing adjustment indicates that symbol timing should be adjusted by an amount corresponding to D digital signal samples.

41. The processor of claim 40, wherein said means for determining a receiver symbol timing adjustment includes:

means for receiving a symbol timing correction signal transmitted from said second communications device.

* * * * *

UNITED STATES PATENT AND TRADEMARK OFFICE
CERTIFICATE OF CORRECTION

PATENT NO. : 7,751,448 B2  Page 1 of 1
APPLICATION NO. : 10/090871
DATED : July 6, 2010
INVENTOR(S) : Laroia et al.

It is certified that error appears in the above-identified patent and that said Letters Patent is hereby corrected as shown below:

Column 13, line 20, claim 5: "first symbol" to read as --last symbol--
Column 13, line 22, claim 5: "first symbol" to read as --last symbol--
Column 13, line 23, claim 5: "first symbol" to read as --last symbol--
Column 13, line 27, claim 6: "first symbol" to read as --last symbol--
Column 14, line 09, claim 10: "first symbol" to read as --last symbol--
Column 14, line 10, claim 10: "first symbol" to read as --last symbol--
Column 14, line 15, claim 11: "first symbol" to read as --last symbol--
Column 16, line 19, claim 28: "farther comprising" to read as --further comprising--
Column 16, line 49, claim 30: "said timing" to read as --said symbol timing--

Signed and Sealed this
Twenty-fifth Day of September, 2012

David J. Kappos
*Director of the United States Patent and Trademark Office*